(12) United States Patent
Hosoi (10) Patent No.: US 8,744,256 B2
(45) Date of Patent: Jun. 3, 2014

(54) CAMERA

(75) Inventor: Kazuma Hosoi, Narashino (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/137,253

(22) Filed: Aug. 1, 2011

(65) Prior Publication Data

US 2011/0286734 A1 Nov. 24, 2011

Related U.S. Application Data

(63) Continuation of application No. 12/923,990, filed on Oct. 19, 2010, now abandoned, which is a continuation of application No. 12/216,867, filed on Jul. 11, 2008, now abandoned.

(30) Foreign Application Priority Data

Jul. 24, 2007 (JP) ................................ 2007-192180

(51) Int. Cl.
*G03B 13/18* (2006.01)

(52) U.S. Cl.
USPC ............................. 396/96; 396/123; 348/349

(58) Field of Classification Search
CPC ............ G03B 3/00; G03B 3/10; G03B 13/18; G03B 13/20; G03B 13/32; G03B 13/34; G03B 13/36
USPC .................................... 396/96, 123; 348/349
See application file for complete search history.

(56) References Cited

U.S. PATENT DOCUMENTS

| 5,526,088 A | 6/1996 | Kusaka |
| 5,724,619 A | 3/1998 | Hamada et al. |
| 5,983,029 A | 11/1999 | Yamada et al. |
| 2003/0099397 A1* | 5/2003 | Matsugu et al. ............... 382/173 |
| 2003/0147638 A1 | 8/2003 | Takasaki et al. |
| 2003/0179310 A1* | 9/2003 | Irie ................................ 348/349 |
| 2005/0140815 A1* | 6/2005 | Nakano et al. ................ 348/345 |
| 2007/0153114 A1 | 7/2007 | Ueda et al. |

FOREIGN PATENT DOCUMENTS

| JP | A-5-11305 | 1/1993 |
| JP | A-05-249369 | 9/1993 |
| JP | A-5-264887 | 10/1993 |
| JP | A-2001-324669 | 11/2001 |
| JP | A-2002-287014 | 10/2002 |
| JP | A-2004-45728 | 2/2004 |
| JP | A-2006-235354 | 9/2006 |

OTHER PUBLICATIONS

Jun. 14, 2011 Office Action issued in Japanese Patent Application No. 2007-192180 (with translation).
Jun. 12, 2012 Japanese Office Action issued in Japanese Application No. 2007-192180 (with translation).
Jan. 29, 2013 Office Action issued in Japanese Patent Application No. 2007-192180.

* cited by examiner

*Primary Examiner* — Rodney Fuller
*Assistant Examiner* — Fang-Chi Chang
(74) *Attorney, Agent, or Firm* — Oliff PLC (57) ABSTRACT

A camera includes: a first sensor of a storage type that has a plurality of pixels; a focus detection unit that detects a focus adjustment state of a photographic optical system based upon a detection signal from the first sensor for a photographic subject; a second sensor that acquires an image of the photographic subject; an extraction unit that extracts a main photographic subject region from image information acquired by the second sensor; and a control unit that controls accumulation of electrical charge by the first sensor, based upon values outputted from pixels of the first sensor that correspond to the main photographic subject region.

11 Claims, 7 Drawing Sheets

CAMERA

INCORPORATION BY REFERENCE

This is a Continuation of U.S. patent application Ser. No. 12/923,990 filed Oct. 19, 2010, which in turn is a Continuation of U.S. patent application Ser. No. 12/216,867, filed Jul. 11, 2008 (now abandoned), which claims priority of Japanese Patent Application No. 2007-192180, filed Jul. 24, 2007.

The disclosure of each of these prior applications is incorporated herein by reference in its entirety.

BACKGROUND OF THE INVENTION

1. Field of the Invention

The present invention relates to a camera that performs focus detection.

2. Description of Related Art

A technique is known for detecting the defocus amount of a photographic optical system of a camera or the like based upon the detection signal from a storage-type sensor that has a plurality of pixels (refer to Japanese Laid-Open Patent Publication Heisei 5-249369).

SUMMARY OF THE INVENTION

When determining the accumulation time period of a storage type sensor in the prior art, an accumulation time period is determined that is suitable for the high luminance portion of the photographic field. Due to this, if the luminance of the main photographic subject is low, there is a fear that the detection signal from such a storage type sensor will be undesirably flattened.

According to the 1st aspect of the present invention, a camera comprises: a first sensor of a storage type that has a plurality of pixels; a focus detection unit that detects a focus adjustment state of a photographic optical system based upon a detection signal from the first sensor for a photographic subject; a second sensor that acquires an image of the photographic subject; an extraction unit that extracts a main photographic subject region from image information acquired by the second sensor; and a control unit that controls accumulation of electrical charge by the first sensor, based upon values outputted from pixels of the first sensor that correspond to the main photographic subject region.

According to the 2nd aspect of the present invention, in the camera according to the 1st aspect, it is preferred that the extraction unit extracts the main photographic subject region by deciding whether or not at least one of a hue and a luminance is approximately equal to each other between an upper end region and another region in a direction from above towards below in the image information.

According to the 3rd aspect of the present invention, in the camera according to the 1st aspect, it is preferred that the first sensor is constituted by a line sensor.

According to the 4th aspect of the present invention, in the camera according to the 3rd aspect, it is preferred that the focus detection unit performs focus detection calculation by a phase detection method in which a defocus amount is calculated according to a gap between a pair of images given by the detection signal of the line sensor.

According to the 5th aspect of the present invention, in the camera according to the 1st aspect, it is preferred that the second sensor is constituted by an area sensor for photometry.

According to the 6th aspect of the present invention, in the camera according to the 1st aspect, it is preferred that the control unit controls accumulation of electrical charge by the first sensor, so that output values of pixels of the first sensor that correspond to the main photographic subject region that has been extracted approach a predetermined target level.

According to the 7th aspect of the present invention, in the camera according to the 6th aspect, it is preferred that the predetermined target level is a level that is lower than a saturation level and is close to the saturation level.

According to the 8th aspect of the present invention, a camera comprises: a first sensor of a storage type that has a plurality of pixels; a focus detection unit that detects a focus adjustment state of a photographic optical system based upon a detection signal from the first sensor for a photographic subject; a second sensor that acquires an image of the photographic subject; an extraction unit that extracts a main photographic subject region from image information acquired by the second sensor; a control unit that controls accumulation of electrical charge by the first sensor, based upon values outputted from pixels of the first sensor that correspond to the main photographic subject region; and a third sensor that acquires an image of the photographic subject for recording.

According to the 9th aspect of the present invention, in the camera according to the 8th aspect, it is preferred that the control unit performs control of electric charge accumulation by the first sensor and acquisition of an image of the photographic subject by the second sensor, before performing acquisition of an image of the photographic subject with the third sensor.

According to the 10th aspect of the present invention, a camera control method comprises: capturing an image; extracting a main photographic subject region from the captured image; and determining a sensitivity of a range-finding sensor having a plurality of pixels, based upon outputs of pixels of the range-finding sensor that correspond to the extracted main photographic subject region.

DESCRIPTION OF PREFERRED EMBODIMENTS

Figure 1:
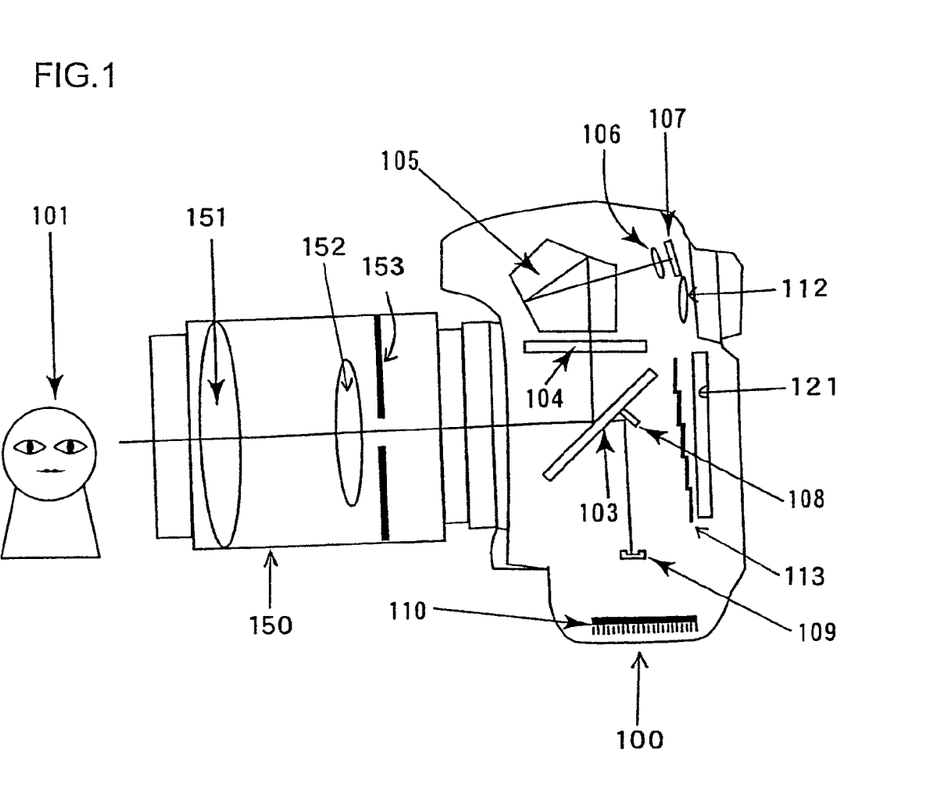
FIG. 1 is a figure for explanation of the structure of the main portions of a single lens reflex electronic camera that is an embodiment of the present invention.

In the following, preferred embodiments for implementation of the present invention will be explained with reference to the drawings. FIG. 1 is a figure for explanation of the structure of the main portions of a single lens reflex electronic camera according to an embodiment of the present invention. In FIG. 1, a photographic lens 150 is installed to a camera main body 100 and is made so as to be detachable therefrom.

Light from a photographic subject 101 is incident upon the camera main body 100 via optical systems 151 and 152 and an aperture 153 of the photographic lens 150. Before a release button (not shown in the figures) is actuated, this photographic subject light that is incident upon the camera main body 100 is conducted upwards by a quick return mirror 103 to a viewfinder section and is imaged upon a viewfinder screen 104.

This photographic subject light that is imaged upon the viewfinder screen 104 is also incident upon a roof pentaprism 105. On the one hand, this roof pentaprism 105 conducts this incident photographic subject light to an eyepiece optical system 112, and on the other hand it also conducts a portion thereof to an area sensor imaging optical system 106. This area sensor imaging optical system 106 re-images an image of the photographic subject upon an area sensor 107. The area sensor 107 outputs to a calculation device 110 a photoelectric conversion signal that corresponds to the brightness of this image of the photographic subject. The area sensor 107 is constituted by a CCD image sensor or the like that has a plurality of photographic conversion elements that correspond to pixels, but its light reception surface has a smaller number of pixels than does that of an image sensor 121 that will be described hereinafter.

On the other hand, a portion of the photographic subject light that is incident upon the camera main body 100 passes through the quick return mirror 103 and is conducted to a range-finding sensor 109 below a sub-mirror 108. The range-finding sensor 109 outputs a photoelectric conversion signal that corresponds to the brightness of the image of the photographic subject to a focus detection device 134 (see FIG. 2) that will be described hereinafter. The range-finding sensor 109 is constituted by a CCD line sensor having a plurality of photoelectric conversion elements that correspond to pixels. The detection signal from the range-finding sensor 109 is used for detecting the state of focus adjustment by the photographic lens 150.

After the release button (not shown in the figures) is depressed, the quick return mirror 103 rotates upwards out of the optical path, and the light from the photographic subject is conducted via a shutter 113 to an image sensor 121, so that an image of the photographic subject is imaged upon the photographic image surface thereof. This image sensor 121 is constituted by a CCD image sensor or the like having a plurality of photoelectric conversion elements that correspond to pixels. The image sensor 121 captures the image of the photographic subject that is imaged upon its photographic image surface, and outputs a photoelectric conversion signal that corresponds to the brightness of this photographic subject image.

Figure 2:
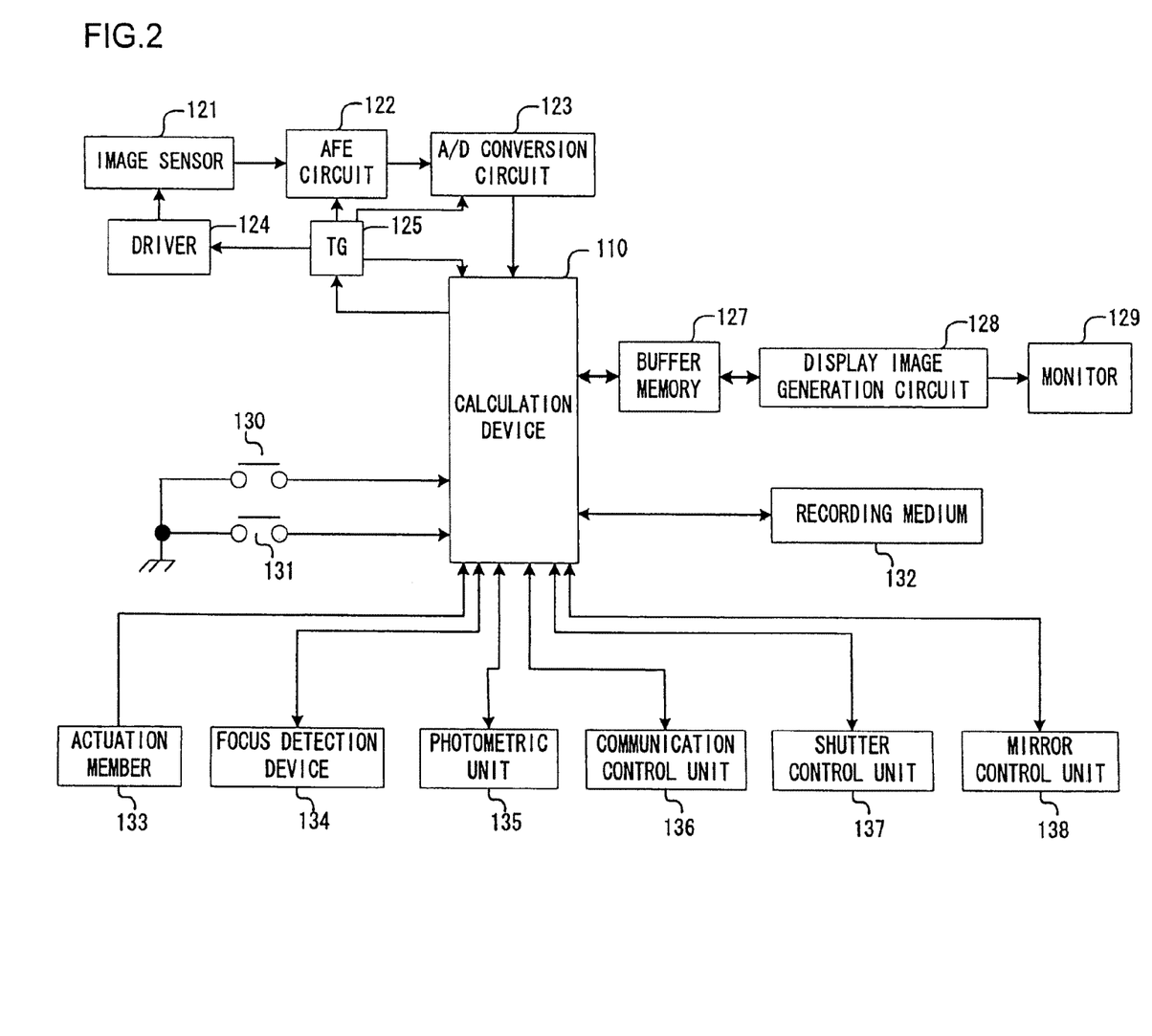
FIG. 2 is a block diagram showing an example of a circuit structure of this single lens reflex electronic camera.

FIG. 2 is a block diagram showing an example of a circuit structure of the above described single lens reflex electronic camera. A timing generator (TG) 125 generates a timing signal according to a command outputted from a calculation device 110, and supplies a timing signal to each of a driver 124, and AFE (Analog Front End) circuit 122, and an A/D conversion circuit 123. The driver 124 causes the image sensor 121 to accumulate electric charges, generates a drive signal for discharging the accumulated charges by using the timing signal described above, and supplies this drive signal that it has generated to the image sensor 121.

The AFE (Analog Front End) circuit 122 performs analog processing (gain control or the like) upon the photoelectric conversion signals (the accumulated electric charges) outputted from the image sensor 121. And the A/D conversion circuit 123 converts the image capture signal after analog processing to a digital signal.

The calculation device 110 is constituted by a micro computer or the like, and inputs signals that are outputted from various blocks that will be described hereinafter, performs predetermined calculations thereupon, and outputs control signals to various blocks based upon the results of these calculations.

A half press switch 130 and a full press switch 131 are operated by depression actuation of the release button (not shown in the figures), and each of them outputs ON signal to the calculation device 110. The ON signal from the switch 130 is outputted when the release button (not shown in the figures) is actuated by being pressed downwards as far as a level of half of its normal stroke, and its output may be cancelled by release of this half stroke pressing down actuation. And the ON signal from the switch 131 is outputted when the release button (not shown in the figures) is actuated by being pressed downwards through its normal stroke, and its output may be cancelled by release of this normal stroke pressing down actuation.

Actuation members 125 output setting and changeover signals that correspond to various types of setting actuations and selection actuations to the calculation device 110. In these actuation members 125 there are included: an actuation member that selects photographic mode and the like; actuation members that set image capture sensitivity (ISO sensitivity), exposure calculation mode (program auto, aperture priority auto, shutter speed priority auto, and the like) and so on; a cruciform switch that outputs a signal indicating its actuation direction; a main switch; and so on.

The focus detection device 134 includes the range-finding sensor 109 described above (see FIG. 1). The focus detection device 134 calculates a focus adjustment state (a defocus amount) for the photographic lens 150 using the detection signal of the range-finding sensor 109, and calculates a shift amount of the optical system 152 for focus adjustment according to the result of this calculation.

In concrete terms, the focus detection device 134 obtains a deviation amount of relative position (a relative gap) between two images that are imaged upon the line sensor in different positions, these images being formed by a pair of ray bundles for defocus amount detection that are incident via different regions of the photographic lens 150. This pair of images of the photographic subject are close to one another in the so called front-focus state in which the photographic lens 150 focuses a clear image of the photographic subject in front of its expected focus plane, and, conversely, are far away from one another in the so-called rear-focus state in which the photographic lens 150 focuses a clear image of the photographic subject behind its expected focus plane. When the two images that are imaged in different positions upon the line sensor are overlapped to one another, then, in the focused state in which a clear image of the photographic subject is focused upon the predetermined focus plane, the above described pair of images agree with one another. Accordingly the focus adjustment state of the photographic lens 150, in other words the defocus amount, may be obtained by obtaining the deviation amount of relative position between the pair of images. And a calculation circuit within the focus detection device 134 determines the forwards or backwards shift amount and the shift direction of the focus adjustment optical system 152 according to the defocus amount, and transmits the data required for driving the optical system 152 to the photographic lens 150 via the calculation device 110 and a communication and control unit 136.

The photometric unit 135 includes the area sensor 107 (see FIG. 1). This photometric unit 135 calculates the luminance of the photographic subject using the detection signal (i.e. the image capture signal) of the area sensor 107. The photometric unit 135 further performs conventional exposure calculation using the image capture sensitivity that is set, lens information that is received via the communication control unit 136, and the photographic subject luminance that has been calculated, and thereby determines a control exposure. As for the exposure calculation mode, this is performed according to an exposure calculation mode that corresponds to an actuation signal from the actuation members 125.

The communication control unit 136 performs communication with the photographic lens 150 that is attached to the camera main body 100, and an external device (a personal computer or the like) that is connected thereto by wireless or cable connection. While on the one hand, by communication between the camera main body 100 and the photographic lens 150, lens information such as the aperture value and lens data and so on is transmitted from the photographic lens 150 to the camera main body 100, also on the other hand lens control information such as the shift amount and a drive command for the above described focus adjustment optical system 152 and the like are transmitted from the camera main body 100 to the photographic lens 150.

By communication between the camera main body 100 and the external device, on the one hand maintenance information and program data and so on may be transmitted from the external device to the camera main body 100, and on the other hand maintenance information and photographic image data and so on may be transmitted from the camera main body 100 to the external device.

A shutter control unit 137 performs charge and drive control of the shutter 113 (see FIG. 1) according to commands that are outputted from the calculation device 110. And, according to commands that are outputted from the calculation device 110, a mirror control unit 138 controls mirror up driving of the quick return mirror 103 (i.e. making it retract upwards out of the optical path in FIG. 1), and mirror down driving thereof (i.e. making it return to its position shown in FIG. 1).

The calculation device 110 performs image processing. This calculation device 110, apart from performing white balance processing and the like upon the image data after digital processing, also performs compression processing to compress the image data in a predetermined format, decompression processing to decompress image data that has been compressed, and the like.

A display image generation circuit 128 creates display data for display upon a liquid crystal monitor 129. The liquid crystal monitor 129 is disposed upon the rear surface of the camera main body 100, and displays photographic images and actuation menus and the like. A recording medium 132 is constituted by a data storage memory such as, for example, a memory card or the like. The calculation device 110 is capable of storing data for photographic images upon the recording medium 132, and reading out of data stored upon the recording medium 132. A buffer memory 127 is used for temporarily storing data during, before, and after various types of image processing, image compression processing, and display data generation processing.

Figure 3:
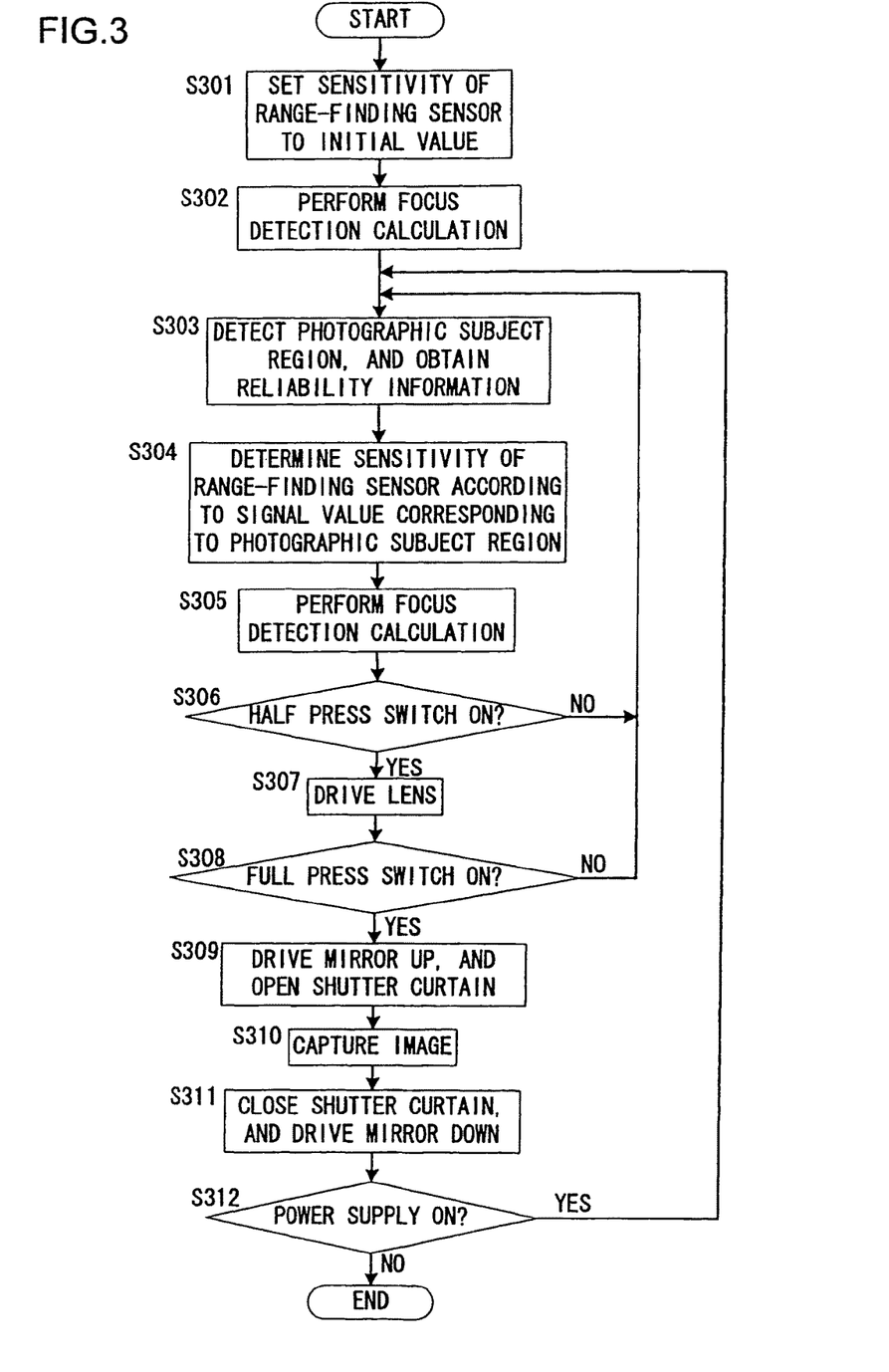
FIG. 3 is a flow chart for explanation of the flow of photographic processing performed by a calculation device.

Since this single lens reflex electronic camera according to this embodiment is particularly distinguished by the feature that the sensitivity of the range-finding element 109 is varied, accordingly it will be explained with particular attention being given to its operation during photography that includes focus detection processing. Varying the sensitivity of the range-finding element 109 is performed by varying, at least, one of the time period T for accumulation of electric charge at the range-finding element 109, and the amplification gain (G) for the accumulation signal. FIG. 3 is a flow chart for explanation of the flow of photographic processing performed by the calculation device 110. The calculation device 110 repeatedly executes the processing of FIG. 3 when the camera power supply is turned ON.

In a step S301 of FIG. 3, the calculation device 110 sends a command to the focus detection device 134 so as to set the initial values for the sensitivity of the range-finding sensor 109 (i.e. of its accumulation time period and gain), and then the flow of control proceeds to a step S302. In this step S302, the calculation device 110 sends a command to the focus detection device 134 so as to perform focus detection calculation using AF (automatic focus adjustment), and then the flow of control proceeds to a step S303. By doing this, a defocus amount is calculated using the detection signal that has been acquired by the range-finding element 109 whose sensitivity has been set to its initial value.

Figure 4:
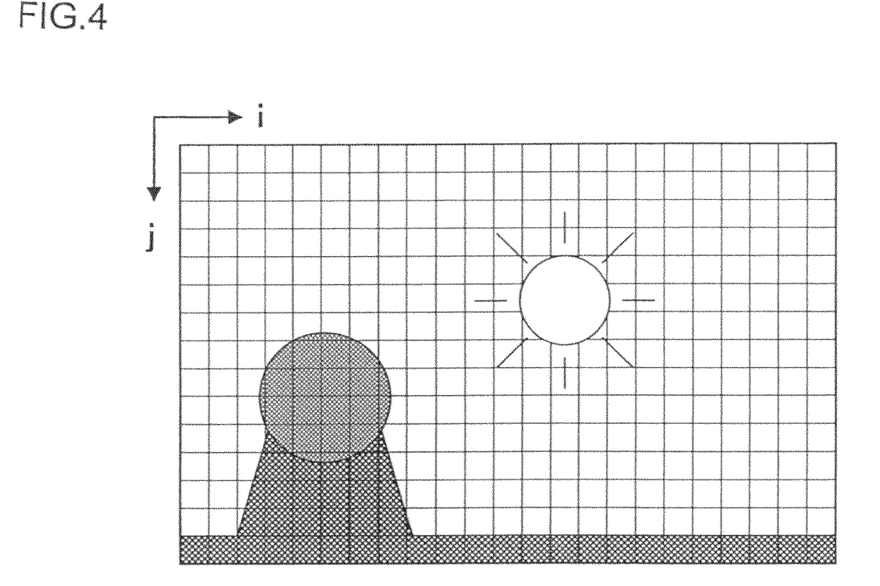
FIG. 4 is a figure showing an example of an image of a photographic subject that is being imaged upon an area sensor.
Figure 5:
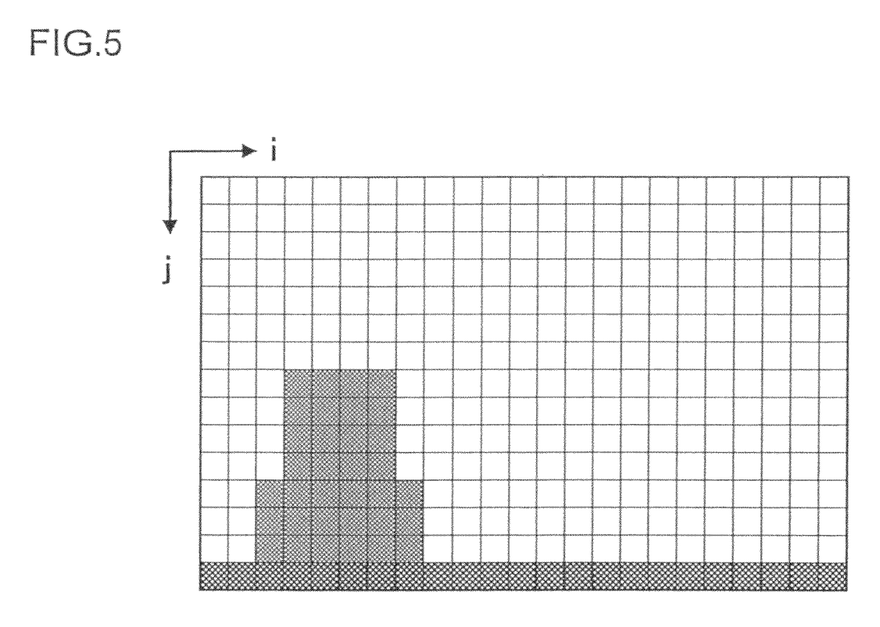
FIG. 5 is a figure showing an example of an image acquired by the area sensor by capturing the photographic subject image of FIG. 4.

In a step S303, the calculation device 110 acquires detection and reliability information for the main photographic subject region, and then the flow of control proceeds to a step S304. In concrete terms, along with issuing a command to the photometric unit 135 and performing AE (automatic exposure) calculation, it acquires an image signal from the area sensor 107 (i.e. a photoelectric conversion signal for each pixel thereof). FIG. 4 is a figure showing an example of an image of the photographic subject that is being imaged upon the area sensor 107, and FIG. 5 is a figure showing an example of an image acquired by the area sensor 107 by capturing the photographic subject image of FIG. 4.

The area sensor 107, for example, may have 22 pixels in the horizontal direction (i.e. in the i direction) and 15 pixels in the vertical direction (i.e. in the j direction). R (red), G (green), and B (blue) color filters are provided upon the photographic image surface of the area sensor 107, in correspondence to the positions of the pixels. In other words, a color filter of one of the colors R (red), G (green), and B (blue) is provided to each of the pixels. Since the area sensor 107 acquires its image through these color filters, accordingly the detection signal from the area sensor 107 includes color information according to the RGB color system.

The calculation device 110 calculates the hue for each pixel according to a known method. The hue for each pixel [i,j] is denoted by Hue[i][j]. Here, i is an integer from 1 through 22, and j is an integer from 1 through 15.

Using the hues Hue[i][j], the calculation device 110 divides the photographic image into two regions: a background region (i.e. a region in which the main photographic subject is not present), and a non-background region (i.e. a region in which the main photographic subject is present). In concrete terms, it detects those pixel positions at which the hue varies by more than a predetermined range, by scanning in order the rows of pixels in the image acquired by the area sensor 107 from one end (for example from the upper edge of the image of the photographic subject) in the direction of the other end (in this example in the direction of the lower side of the photographic subject).

The above described pixel position detection is performed according to the conditional expressions (1) and (2) below.

$$ABS(\text{Hue}[i][j] - \text{Hue}[i][1]) < Th\text{Hue} \tag{1}$$

Here, ABS( ) is a function that calculates the absolute value within the parentheses. And ThHue is a threshold value for decision that is determined in advance from experimental results.

$$M1[i][j-1] \neq 0 \tag{2}$$

Here, M1[i][j] indicates whether or not the region that corresponds to this pixel is included in the background. If M1[i][j] is not 0 then this pixel is included in the background, whereas if M1[i][j] is equal to zero then this pixel is not included in the background. In this embodiment, it is supposed that the initial values of M1 [i][1] in the upper edge pixel row are 1 (i.e. it is hypothesized that these pixels are background pixels), whereas it is supposed that the initial values of M1[i][j] in the second through the 15th rows ($2 \leq j \leq 15$) are 0 (i.e. it is hypothesized that these pixels are not background pixels).

The calculation device 110 takes the pixel positions [i,j] for which the conditional expression (1) is not satisfied, as being the boundary that divides between the background region and the non-background region. And, when the conditional expression (1) is satisfied, the calculation device 110 makes the decision specified by the conditional expression (2), and increments the M1[i][j] of the subject pixel if the conditional expression (2) is satisfied.

Figure 6:
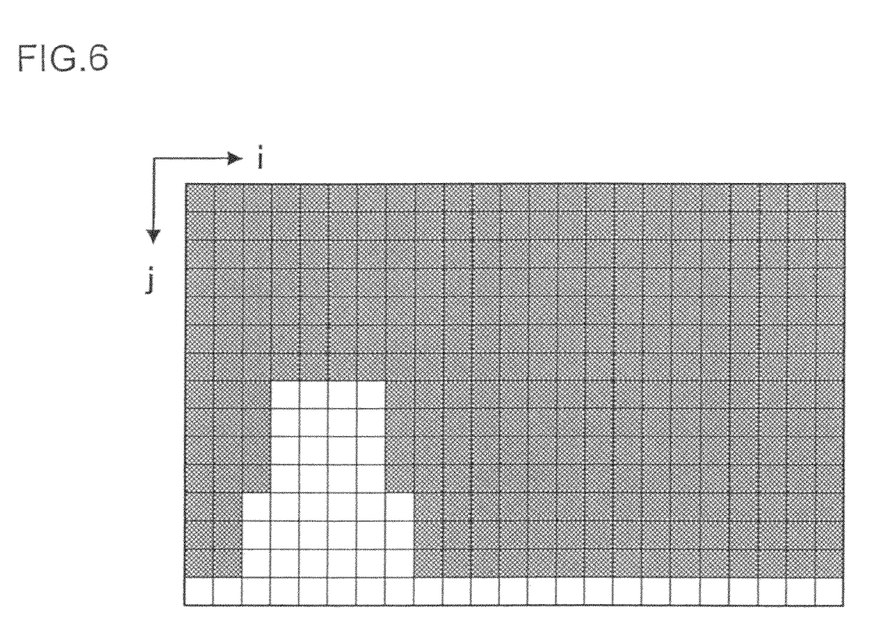
FIG. 6 is a figure showing an example of a situation in which the image of the photographic subject is divided into two regions.

By repeating the above decisions, the hues of the upper edge pixels (i.e. the pixels in the first row) that are hypothesized as being the background, and the hues of the pixels in the second and subsequent rows, are sequentially compared together, and the pixel positions in the pixel rows where the hue varies by more than the decision threshold value for the first time, are taken as constituting the boundary between the background region and the non-background region. FIG. 6 is a figure showing an example of a situation in which the image of the photographic subject is divided into two regions. The dark colored region at the upper side of the screen is the background region, while the light colored region at the lower side of the screen shows the non-background region (that is detected as being the main photographic subject).

The calculation device 110 may, for example, decide that the reliability is low, if no pixel row has been detected for which the hue varies by more than the decision threshold value. If some pixel row is detected for which the hue varies by more than the decision threshold value, then it is decided that the reliability is high.

In a step S304 of FIG. 3, the calculation device 110 determines the sensitivity of the range-finding sensor 109. In concrete terms, based upon the signal values, in the detection signals from the range-finding sensor 109 (whose sensitivity is at its initial value) that has been acquired in the step S302, from the pixels that correspond to the main photographic subject region detected in the step S303, it determines this sensitivity so that its signal value approaches close to a target level. This target level is taken as being a level that is lower than the saturation level, but is as close as possible to the saturation level. In more concrete terms, the sensitivity is determined so that the average value of the signal values from the pixels that correspond to the main photographic subject region becomes approximately the same as the target level. It should be understood that the it would also be acceptable to arrange to determine the sensitivity so that the maximum value of the signal values from the pixels that correspond to the main photographic subject region becomes approximately the same as the target level.

Figure 7:
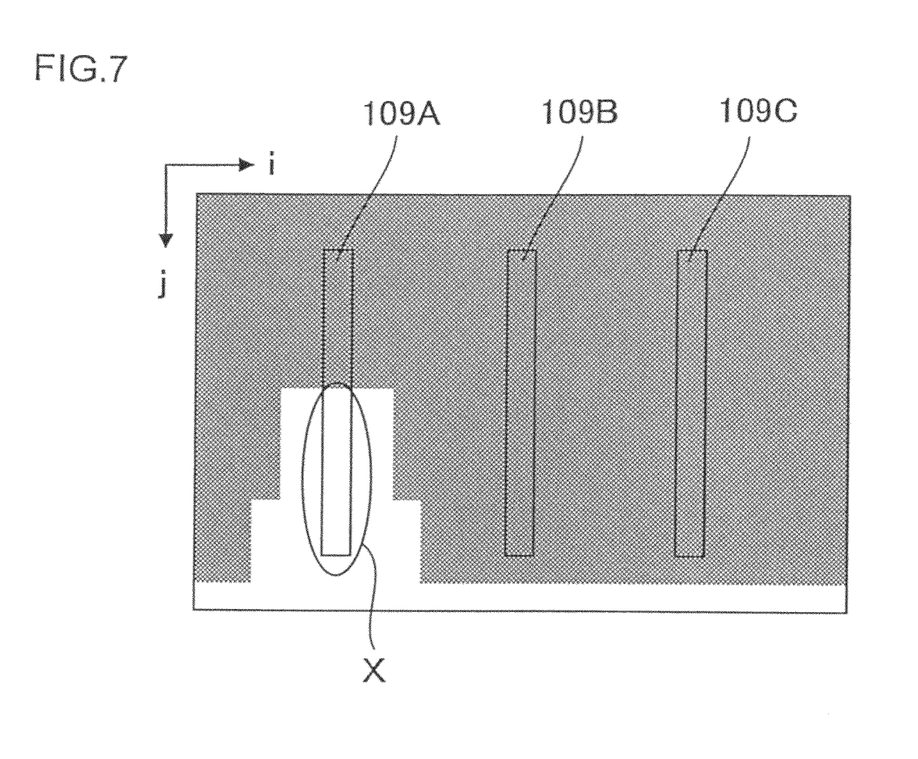
FIG. 7 is a figure showing an example of the relative positional relationship between light reception areas of a range-finding sensor and the light reception area of the area sensor.

FIG. 7 is a figure showing an example of the relative positional relationship between the light reception area of the range-finding sensor 109 and the light reception area of the area sensor 107. The range-finding sensor 109 of this embodiment has a light reception area 109A that receives light at the left side of the screen, a light reception area 109B that receives light at the middle of the screen, and a light reception area 109C that receives light at the right side of the screen. In this case the calculation device 110 determines the sensitivity of the line sensor having this light reception area 109A that corresponds to the main photographic subject region, based upon the signal values from a pixel group X upon the line sensor that overlaps with the above described main photographic subject region.

In a step S305, the calculation device 110 sends the sensitivity information and the reliability information that have been determined in the step S304 to the focus detection device 134 and performs focus detection calculation for AF (automatic focus adjustment), and then the flow of control proceeds to a step S306. Due to this, the focus detection device 134 changes the sensitivity of the range-finding sensor 109 to the value that has been commanded from the calculation device 110, and the defocus amount is calculated using the detection signal acquired by the range-finding element 109 whose sensitivity has been set after this change.

It should be understood that, if reliability information has been received to the effect that the reliability is low, then the focus detection device 134 calculates the defocus amount using a detection signal that has been acquired by the range-finding element 109 whose sensitivity is set to the initial value described above.

In the step S306, the calculation device 110 makes a decision as to whether or not the release half press switch has been actuated. If an actuation signal has been inputted from the release half press switch 130, then the calculation device 110 reaches an affirmative decision in this step S306 and the flow of control proceeds to a step S307. On the other hand, if no actuation signal has been inputted from the release half press switch 130, then the calculation device 110 reaches a negative decision in this step S306 and the flow of control is returns back to the step S303, and the processing described above is repeated.

In the step S307, the calculation device 110 sends lens control information such as a shift amount for the optical system 152 for focus adjustment or a drive command or the like to the photographic lens 150 via the communication control unit 136, and then the flow of control proceeds to a step S308. By the lens drive mechanism (not shown in the figures) within the photographic lens 150 shifting the optical system 152 along the direction of the optical axis according to this lens control information, the photographic lens 150 is focused upon the main photographic subject 101.

In the step S308, the calculation device 110 makes a decision as to whether or not the release full press switch has been actuated. If an actuation signal has been inputted from the release full press switch 131, then the calculation device 110 reaches an affirmative decision in this step S308 and the flow of control proceeds to a step S309. On the other hand, if no actuation signal has been inputted from the release full press switch 131, then the calculation device 110 reaches a negative decision in this step S308 and the flow of control is returns back to the step S303, and the processing described above is repeated.

In the step S309, the calculation device 110 sends a command to the mirror control unit 138, so as to start the up driving of the quick return mirror 103. Moreover, the calculation device 110 sends a command to the shutter control unit 137 and drives a curtain of the shutter 113 to open it, and then the flow of control proceeds to a step S310.

In the step S310, the calculation device 110 causes the image sensor 121 to accumulate electrical charges for photography, and then the flow of control proceeds to a step S311. And, after the closing of the shutter 113 that will be described hereinafter, the calculation device 110 discharges the accumulated electrical charges.

In the step S311, the calculation device 110 sends a command to the shutter control unit 137, and drives the curtain of the shutter 113 to close it. Moreover, the calculation device 110 sends a command to the mirror control unit 138 to start the down driving of the quick return mirror 103, and then the flow of control proceeds to a step S312.

Furthermore, the calculation device 110 performs predetermined image processing upon the image that has been captured, and records the image data after image processing upon the recording medium 132. And the calculation device 110 sends a command to the display image generation circuit 128, so as to cause the image that has been photographed to be replay displayed upon the liquid crystal monitor 129. With this, the sequence for photographic processing terminates.

In the step S312, the calculation device 110 makes a decision as to whether or not the camera power supply continues to be ON. If the camera main switch (not shown in the figures) is not actuated to OFF and moreover, during an episode of non-actuation, a timer has not timed up, then the CPU 101 reaches an affirmative decision in this step S312 and the flow of control returns to the step S303. On the other hand, if the main switch is actuated to OFF or the timer has timed up during an episode of non-actuation, then the calculation device 110 reaches a negative decision in this step S312 and turns the supply of power to the camera OFF, and then the processing of FIG. 3 terminates.

According to the embodiment explained above, the following advantageous operational effects are obtained.

(1) It is arranged for the calculation device 110 of the camera to extract the region that includes the main photographic subject 101 from the image information obtained in two dimensions by the area sensor 107 for photometry, and to determine the sensitivity of the line sensor (the range-finding sensor 109) including the light reception area 109A that corresponds to this extracted region, based upon the signal values from a pixel group X of this line sensor. Due to this, it is possible to acquire the pair of images for focus detection with a sensitivity that is appropriate to the luminance of the main photographic subject 101, without receiving any influence from the luminance of the background region other than the main photographic subject. In other words, it is possible to control in an appropriate manner the accumulation of electrical charges by the range-finding sensor 109 used for focus detection, that is a storage type image sensor. As a result, it is possible to obtain signal values of an appropriate level from the range-finding sensor 109, and thus to obtain the defocus amount correctly.

(2) In addition to (1) above, by eliminating the line sensors such as the light reception areas 109B and 109C that do not correspond to the main photographic region from the subject of focus detection calculation, it is possible to alleviate the burden of calculation.

(3) It is arranged to decide upon the boundary between the main photographic subject region and other regions by deciding, between the upper edge pixel and pixels from above towards below of the image information from the area sensor 107, whether or not the difference of hue is within the predetermined decision threshold value. Generally, the possibility is high that the upper edge of the image of the photographic subject is the background (i.e. is not included in the main photographic subject), and the possibility is high that image information of the same hue as the background is part of the background. Due to this, it is possible to distinguish between the background region and other regions (i.e. regions for which there is a possibility that they are included within the main photographic subject 101) in a simple manner. It should be noted that the boundary between the main photographic subject region and other regions can be decided by deciding, between adjacent pixels of the picture information from the area sensor 107 from above towards below, whether or not the difference of hue is within a predetermined decision threshold value.

(4) Since the area sensor 107 is provided separately from the image sensor 121 for photography, and its pixel number is made to be smaller than the number of pixels of the image sensor 121 (for example tens of millions of pixels), accordingly it is possible to make the structure more compact, as compared to the case of providing an area sensor 107 that is the same as the image sensor 121. Moreover, by using the image information that is obtained by the area sensor 107 for photometry, it is possible to determine the sensitivity of the range-finding sensor 109 at the time point of photometry, before the image sensor 121 captures its image.

(5) Since the range-finding sensor 109 is provided separately from the area sensor 107, and is made as a line sensor whose pixel number is smaller than the number of pixels of the area sensor 107, accordingly it is possible to make the structure more compact, as compared to the case of providing a range-finding sensor 109 that is the same as the area sensor 107.

Variant Embodiment #1

In the above explanation, an example was described in which, when dividing the image information from the area sensor 107 into two groups, the boundary for division was decided by deciding whether or not the change of hue was within a predetermined hue decision threshold value. Instead of this, it would also be acceptable to arrange to decide upon the boundary for division by deciding whether or not the change of luminance is within a predetermined luminance decision threshold value.

Variant Embodiment #2

Moreover, it would also be acceptable to arrange to decide upon the boundary for division by deciding upon both the hue and the luminance.

Variant Embodiment #3

In the above explanation, when deciding upon the boundary for division, it was arranged to compare together the hue or the luminance between the upper edge pixel and pixels from the upper edge towards the lower edge of the image information from the area sensor 107, thereof. However, instead of this, it would also be acceptable to arrange to make a comparison between the right edge pixel and pixels from the right edge towards the left edge of the image information from the area sensor 107, or between left edge pixel and pixels from the left edge towards the right edge of the image information from the area sensor 107.

It should be noted as mentioned above that it would also be acceptable to arrange to make a comparison between adjacent pixels from the area sensor 107 from the right edge of the image information towards the left edge thereof, or between adjacent pixels from the area sensor 107 from the left edge of the image information towards the right edge thereof.

Variant Embodiment #4

Although an example has been shown and explained in which there was only a single line sensor having a light reception area corresponding to the main photographic subject region, the present invention can also be applied to a case in which a plurality of sensors are present that have light reception areas corresponding to the main photographic subject region. In this case, for each line sensor, it will be sufficient to determine the sensitivities of the line sensors based upon the signal value from a pixel group that overlaps the main photographic subject region; it is not necessary to adjust the sensitivities between the plurality of line sensors.

Variant Embodiment #5

Although an example of an electronic camera has been explained, the present invention may also be applied to a film camera.

The above described embodiments are examples, and various modifications can be made without departing from the scope of the invention.

What is claimed is:

1. A camera, comprising:
   a first storage type line sensor that corresponds to a first focus detection area;
   a second storage type line sensor that corresponds to a second focus detection area, which is different from the first focus detection area;
   a focus detection unit that detects a focus adjustment state of a photographic optical system by using a signal output from at least one of the first storage type line sensor and the second storage type line sensor;
   a photometric sensor that acquires image information corresponding to an image of a photographic subject from each of a plurality of areas;
   an extraction unit that extracts a main photographic subject region corresponding to an area where a main subject exists from the image information acquired by the photometric sensor; and
   a control unit that judges whether the main photographic subject region is located on the first storage type line sensor or the second storage type line sensor, selects, in units of pixels, pixels of a range corresponding to the main photographic subject region in a line sensor that has been judged that the main photographic subject region is located thereupon, controls an accumulation time period of the first storage type line sensor and the second storage type line sensor by using values outputted from the pixels selected in the judged line sensor and not using values outputted from pixels not selected in the judged line sensor.

2. The camera according to claim 1, wherein
   the extraction unit extracts the main photographic subject region by deciding whether or not at least one of a hue and a luminance of at least one pixel of an upper region is approximately equal to at least one of a hue and a luminance of at least one pixel of another region in a direction from above towards below in the image information.

3. The camera according to claim 1, wherein
   the focus detection unit performs a focus detection calculation by a phase detection method in which a defocus amount is calculated according to a gap between a pair of images given by a signal output of the first storage type line sensor or the second storage type line sensor.

4. The camera according to claim 1, wherein
   the extraction unit assumes an edge region in the image information as a region that is not the main photographic subject region, and extracts the main photographic subject region by deciding whether or not at least one of a hue and a luminance of at least one pixel in the edge region is approximately equal to at least one of the hue and the luminance of at least one pixel of another region in the image information.

5. The camera according to claim 4, wherein
   the extraction unit takes an upper end region in the image information as the edge region, takes a region in a direction from above towards below in the image information as the another region, and extracts the main photographic subject region by deciding whether or not at least one of the hue and the luminance of at least one pixel of the edge region is approximately equal to at least one of the hue and the luminance of at least one pixel of the another region in the image information.

6. The camera according to claim 1, wherein
   the extraction unit extracts the main photographic subject region by deciding whether or not a hue of at least one pixel is approximately equal to the hue of at least one other pixel in the image information.

7. A camera, comprising:
   a plurality of storage type line sensors that respectively correspond to a plurality of focus detection areas and each include a plurality of pixels;
   a focus detection unit that detects a focus adjustment state of a photographic optical system by using a signal output from at least one of the storage type line sensors;
   a photometric sensor that acquires image information corresponding to an image of a photographic subject;
   an extraction unit that extracts a main photographic subject region corresponding to an area where a main subject exists from the image information acquired by the photometric sensor;
   a first selection unit that selects a line sensor from among the plurality of storage type line sensors that corresponds to the main photographic subject region;
   a second selection unit that selects pixels, from among the plurality of pixels of the line sensor selected by the first selection unit, that correspond to the main photographic subject region;
   a control unit that controls an accumulation time period of at least one of the plurality of storage type line sensors by using values outputted from the pixels selected by the second selection unit.

8. The camera according to claim 7, wherein
   the plurality of storage type line sensors are arranged at intervals in a first direction; and
   the plurality of pixels of each of the plurality of storage type line sensors are arranged in a second direction perpendicular to the first direction.

9. The camera according to claim 7, wherein
   the control unit does not control the accumulation time period of the plurality of storage type line sensors by using values outputted from pixels not selected by the second selection unit.

10. The camera according to claim 7, wherein
    the focus detection unit calculates a defocus amount by using a signal output from either one of the storage type line sensors.

11. A camera, comprising:
    a plurality of storage type line sensors that respectively correspond to a plurality of focus detection areas and each include a plurality of pixels;
    a focus detection unit that detects a focus adjustment state of a photographic optical system by using a signal output from at least one of the storage type line sensors;
    a photometric sensor that acquires image information corresponding to an image of a photographic subject;

an extraction unit that extracts a main photographic subject region corresponding to an area where a main subject exists from the image information acquired by the photometric sensor;

a control unit that, in a storage type line sensor corresponding to one of the plurality of focus detection areas, controls an accumulation time period of the storage type line sensor by using values outputted from pixels corresponding to the main photographic subject region in the storage type line sensor and does not control the accumulation time period by using values outputted from pixels not corresponding to the main photographic subject region in the storage type line sensor.

* * * * *